United States Patent
Gustafson

(10) Patent No.: US 10,236,123 B2
(45) Date of Patent: Mar. 19, 2019

(54) METHODS AND SYSTEMS TO MINIMIZE DELAMINATION OF MULTILAYER CERAMIC CAPACITORS

(71) Applicant: VQ RESEARCH, INC., Palo Alto, CA (US)

(72) Inventor: John L. Gustafson, Santa Clara, CA (US)

(73) Assignee: VQ RESEARCH, INC., Palo Alto, CA (US)

( * ) Notice: Subject to any disclaimer, the term of this patent is extended or adjusted under 35 U.S.C. 154(b) by 0 days.

(21) Appl. No.: 15/406,763

(22) Filed: Jan. 15, 2017

(65) Prior Publication Data

US 2017/0236644 A1   Aug. 17, 2017

Related U.S. Application Data

(63) Continuation-in-part of application No. 15/212,297, filed on Jul. 18, 2016, now Pat. No. 10,128,047, (Continued)

(51) Int. Cl.

| | |
|---|---|
| *H01G 4/30* | (2006.01) |
| *H01G 4/012* | (2006.01) |
| *H01G 4/002* | (2006.01) |
| *H01G 4/248* | (2006.01) |
| *H01G 4/232* | (2006.01) |
| *H01G 4/12* | (2006.01) |
| *H01G 4/005* | (2006.01) |

(52) U.S. Cl.
CPC ............... *H01G 4/30* (2013.01); *H01G 4/002* (2013.01); *H01G 4/005* (2013.01); *H01G 4/012* (2013.01); *H01G 4/1227* (2013.01); *H01G 4/232* (2013.01); *H01G 4/248* (2013.01)

(58) Field of Classification Search
CPC .......... H01G 4/005; H01G 4/012; H01G 4/12; H01G 4/30; H01G 4/248; H01G 4/232
See application file for complete search history.

(56) References Cited

U.S. PATENT DOCUMENTS

| | | |
|---|---|---|
| 2,816,054 A | 12/1957 | Howden |
| 3,115,581 A | 12/1963 | Kilby |
| (Continued) | | |

*Primary Examiner* — Nguyen T Ha
(74) *Attorney, Agent, or Firm* — Ricky Lam

(57) ABSTRACT

Methods and systems to improve a multilayer ceramic capacitor using additive manufacturing are disclosed. Conductive layer ends of a multilayer ceramic capacitor may be modified to comprise a round shape, which may increase structural stability of the capacitor's layers. Other configurations may be possible, such as bulbous or wavy shaped conductive layer ends. The layers may comprise one or more pillars made from dielectric material, e.g., barium titanate, disposed through a portion of a conductive layer. The dielectric material may be the same material used in the insulator layers of the capacitor. Each pillar may comprise a plurality of spot connections surrounding its perimeter. The embedded pillars may be used to prevent delamination of the layers and to increase mechanical strength. Additionally, an algorithm of a computing device may determine an optimal shape, size, and/or configuration of the capacitor based on one or more predetermined specifications or properties.

7 Claims, 18 Drawing Sheets

Related U.S. Application Data which is a continuation-in-part of application No. 15/250,993, filed on Aug. 30, 2016, application No. 15/406,763, which is a continuation-in-part of application No. 15/273,703, filed on Sep. 23, 2016, application No. 15/406,763, which is a continuation-in-part of application No. 15/376,729, filed on Dec. 13, 2016.

(60) Provisional application No. 62/194,256, filed on Jul. 19, 2015, provisional application No. 62/211,792, filed on Aug. 30, 2015, provisional application No. 62/232,419, filed on Sep. 24, 2015, provisional application No. 62/266,618, filed on Dec. 13, 2015, provisional application No. 62/279,649, filed on Jan. 15, 2016.

(56) References Cited

U.S. PATENT DOCUMENTS

| | | | |
|---|---|---|---|
| 3,775,838 A | 12/1973 | Dalmasso | |
| 3,864,817 A | 2/1975 | Lapham | |
| 5,697,043 A | 12/1997 | Baskaran | |
| 5,888,329 A | 3/1999 | Cho | |
| 6,141,040 A | 10/2000 | Toh | |
| 6,327,134 B1* | 12/2001 | Kuroda | H01G 4/232 361/303 |
| 6,365,480 B1 | 4/2002 | Huppert | |
| 6,365,960 B1 | 4/2002 | Pollock | |
| 7,199,016 B2 | 4/2007 | Heston | |
| 7,495,891 B2 | 2/2009 | Lee | |
| 7,667,302 B1 | 2/2010 | Chang | |
| 7,766,641 B2 | 8/2010 | Silverbrook | |
| 8,054,608 B2 | 11/2011 | Yoon | |
| 8,163,077 B2 | 4/2012 | Eron | |
| 8,193,532 B2 | 6/2012 | Arai | |
| 8,581,381 B2 | 11/2013 | Zhao | |
| 2003/0164746 A1* | 9/2003 | Kido | C04B 35/462 333/219 |
| 2004/0214712 A1* | 10/2004 | Tatekawa | C04B 35/457 501/138 |
| 2010/0103586 A1* | 4/2010 | Tang | H01G 4/232 361/301.4 |
| 2010/0289128 A1 | 10/2010 | Camacho | |
| 2013/0114182 A1 | 5/2013 | Suh | |
| 2014/0057087 A1* | 2/2014 | Adachi | H01G 4/30 428/212 |
| 2014/0285950 A1* | 9/2014 | Morita | H01G 4/12 361/321.2 |
| 2015/0043126 A1* | 2/2015 | Hurwitz | H01L 28/65 361/303 |
| 2015/0083315 A1* | 3/2015 | Tanaka | H01G 4/30 156/264 |
| 2015/0279566 A1* | 10/2015 | Otani | H01G 4/30 361/301.4 |

* cited by examiner

METHODS AND SYSTEMS TO MINIMIZE DELAMINATION OF MULTILAYER CERAMIC CAPACITORS

CLAIMS OF PRIORITY

This patent application is a continuation-in-part of:
(1) U.S. utility patent application Ser. No. 15/212,297, titled 'Methods and systems for increasing surface area of multi-layer ceramic capacitors' filed on Jul. 18, 2016, which claims benefit of U.S. provisional patent application No. 62/194,256, titled 'Methods and systems for increasing capacitance of multi-layer ceramic capacitors', filed on Jul. 19, 2015.
(2) U.S. utility patent application Ser. No. 15/250,993, titled 'Methods and systems for geometric optimization of multi-layer ceramic capacitors' filed on Aug. 30, 2016, which claims benefit of U.S. provisional patent application No. 62/211,792, titled 'Methods and systems for geometric optimization of multi-layer ceramic capacitors', filed Aug. 30, 2015.
(3) U.S. utility patent application Ser. No. 15/273,703, titled 'Methods and systems for material cladding of multilayer ceramic capacitors' filed on Sep. 23, 2016, which claims benefit of U.S. provisional patent application No. 62/232,419, titled 'Methods and systems for material cladding of multi-layer ceramic capacitors', filed Sep. 24, 2015.
(4) U.S. utility patent application Ser. No. 15/376,729, titled 'Methods and systems to improve printed electrical components and for integration in circuits', filed Dec. 13, 2016, which claims benefit of U.S. provisional patent application No. 62/266,618, titled 'Methods and systems to improve printed electrical components and for integration in circuits', filed Dec. 13, 2015.
(5) U.S. provisional patent application No. 62/279,649, 'Methods and systems to minimize delamination of multi-layer ceramic capacitors', filed Jan. 15, 2016.

FIELD OF TECHNOLOGY

This disclosure relates generally to forming a novel structure of multilayer ceramic capacitors (MLCC) using the technique of drop-on-demand additive printing to deposit droplets of deposition material.

BACKGROUND

Multi-layer ceramic capacitors, or MLCCs, have traditionally been manufactured by forming a tape from an insulating ceramic slurry, printing conductive ink layers, and then pressing the layers together to form a laminated alternation of insulator and conductor. Particularly in the case of a physically large MLCC, there is a possibility of delamination under the stress of temperature or pressure. If a layer separates, even slightly, there may be a drop in the capacitance that can render it out of spec, or there can be complete device failure.

This tendency is aggravated by the fact that metals do not usually adhere well to ceramics in general. A well-known example of this was the difficulty the early US Space Shuttle flights had with losing ceramic tiles from the Shuttle during re-entry, which requires special procedures to bond the tiles to the metal surface of the Shuttle. In the case of MLCCs, it can force the use of expensive silver oxide ink instead of ordinary copper-based ink. There is a need for a system and a method to manufacture MLCCs comprising with high resistance to delamination and maintains the overall physical strength and electrical properties of the MLCC.

SUMMARY

Recently, it has become possible to create passive components using additive manufacturing (also called 3D printing) where ink jets or aerosol jets deposit materials such as ceramic slurry and conductive ink. This is an inherently more precise and repeatable process than traditional methods, and produces higher density components with less material waste. The key advantage for purposes of this invention disclosure is that more complex shapes can be printed than simple flat layers, and this capability can be used to improve the structural integrity of the part.

In one aspect, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

In another aspect, the present invention discloses a method and a system to increase structural stability of MLCC layers by rounding of conductive layer ends. The round ends may also eliminate areas of intense electric field, e.g., hotspots. Other configurations may also be possible, such as bulbous or wavy shapes.

In yet another aspect, the present invention discloses methods and systems to prevent or minimize MLCC delamination. Multi-layer ceramic capacitors, or MLCCs, have traditionally been made by forming a tape from an insulating ceramic slurry, printing conductive ink layers, and then pressing the layers together to form a laminated alternation of insulator and conductor. Particularly in the case of a physically large MLCC, there is possibility of delamination under the stress of temperature and/or pressure. If a layer separates, even slightly, there is a drop in the capacitance that can render it out of spec, or there can be complete device failure. An object of this invention is to provide a reinforcement of insulation material among and between layers of an MLCC, which may provide added mechanical endurance properties and represses or prevents delamination between the layers.

Embedded pillars of dielectric may be used to prevent delamination and increase mechanical strength. The lamination strength may be increased through a process of 'quilting', which is made possible with the systems and methods of the present invention, namely the technique of drop-on-demand printing, as the prior art process of 'tape casting' would not be able to accomplish this technique. Quilting may refer to the creation of spot connections, e.g., pillars, of insulator through the conductive layers.

In yet another aspect, the present invention discloses a system and a method for optimizing geometry of a multi-layer ceramic capacitor by using an algorithm of a computing device comprising a memory and processor to determine configurations of conductive layer ends and/or arrangements of one or more pillars based on predetermined specifications or properties of the capacitor. The algorithm may be inputted with one or more desired specification or property, such as, e.g., maximum capacitance, and may output the most cost effective size, shape, and/or configuration of an ideal MLCC to match the desired specification or property. Once a capacitor configuration is determined, an additive manufacturing printer communicatively coupled to the algorithm may produce the desired product.

BRIEF DESCRIPTION OF THE DRAWINGS

Example embodiments are illustrated by way of example and are not limited to the figures of the accompanying drawings, in which, like references indicate similar elements.

DETAILED DESCRIPTION

Disclosed are methods and systems to minimize delamination of multilayer ceramic capacitors (MLCCs). Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

A capacitor is an electrical device that stores energy in the electric field between a pair of closely spaced conductors. Capacitors may be used as energy-storage devices, and may also be used to differentiate between high-frequency and low-frequency signals. Capacitance value may be defined as a measure of how much charge a capacitor can store at a certain voltage.

Figure 1:
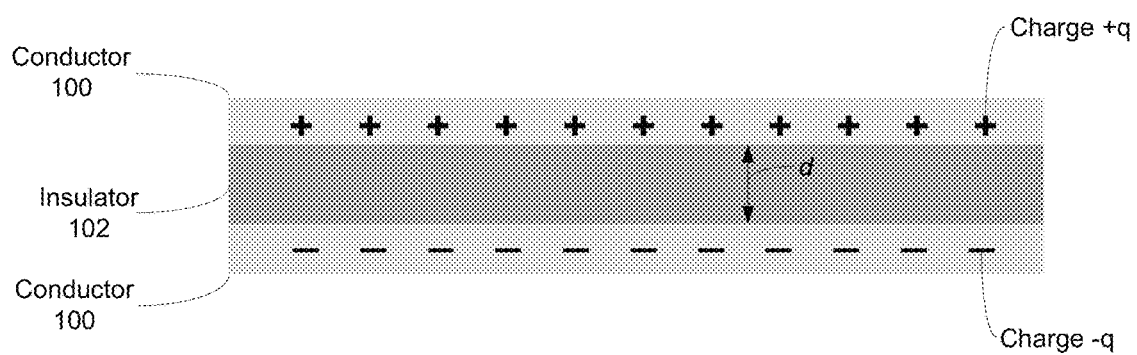
FIG. 1 is a cross-section view of an example plate capacitor.

FIG. 1 is a cross-section view of an example plate capacitor. A capacitor may comprise two conductor 100 (electrodes) separated by insulator 102. The plate capacitor may be manufactured from three parallel plates. If the plates have an area, A, that is separated by a distance d as shown, then the capacitance, C, can be expressed as the formula:

$$C = \frac{K\epsilon_0 A}{d}$$

where K is the ratio of the insulator permittivity to that of a vacuum (sometimes called the dielectric constant of the material), and $\epsilon_0$ is the permittivity of a vacuum. The formula may be inexact due to edge effects: at the border of the parallel plates, the electric field bulges away from the capacitor. If the plate size is large relative to separation 'd', the edge effect is negligible.

Figure 2:
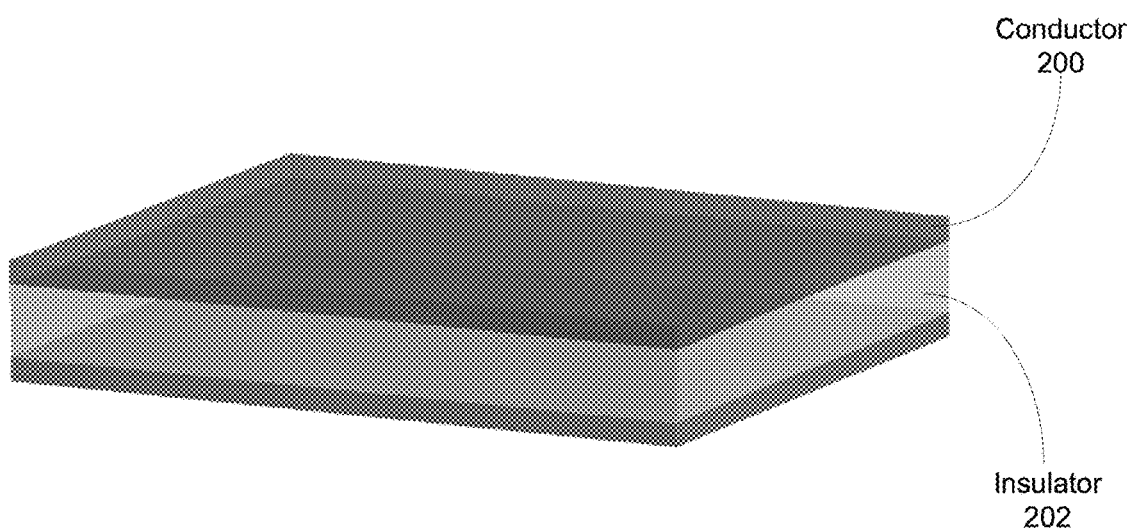
FIG. 2 is a perspective view of an example single-capacitive layer capacitor, shown semi-transparent for clarity.

FIG. 2 is a perspective view of an example single-capacitive layer capacitor, shown semi-transparent for clarity. The typical rectangular shape may allow for ease of close-packing on a circuit board, and the height dimension may be small relative to the other dimensions to allow construction of flat or low-profile devices. A capacitor may comprise two conductors 200 separated by an insulator 202. Ceramic capacitors may be created by tape casting, in which a slurry of powdered ceramic and binder is spread over a flat surface with a knife edge to create the insulator, and coated with conductive ink.

Figure 3:
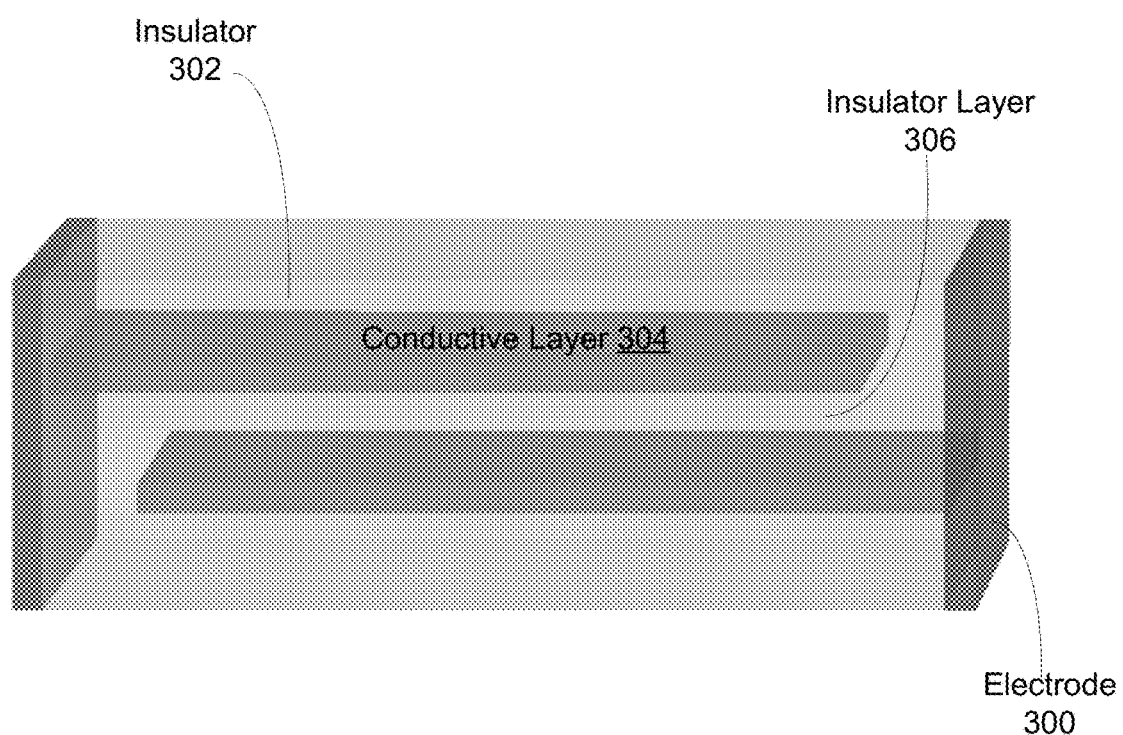
FIG. 3 shows a single capacitive layer capacitor encased in insulation, and capped with conductive electrodes, according to at least one embodiment.

FIG. 3 shows a single capacitive layer capacitor encased in insulation, and capped with conductive electrodes, according to at least one embodiment. A pair of electrodes 300 may be disposed on the left side and right side of the capacitor instead of the top or bottom to permit surface mounting on a circuit board. The capacitor may be encased in insulator 302 on the top, bottom, front and back sides, e.g., the non-electrode sides, to protect the device both structurally and electrically. Note that this may entail shortening the internal conductive layer 304 where they would come too close to the opposite electrode 300, to preserve the insulative spacing to at least as great as that between layers in the vertical direction. Insulator layer 306 may be dielectric disposed between a pair of conductive layers 304.

High-permittivity ceramic materials used as insulator material, such as sintered barium titanate, are structurally strong in thick layers. However, in thin layers, like many materials, it may not be of sufficient strength. Stress can cause strain and separation, as well as cracking. External pressure can be the source of the stress, or it can be caused by heat since thermal expansion can be uneven in the device and will lead to disparate thermal expansion between the metal and ceramic layer. When separation occurs, it is called delamination since the layers no longer have the intended spacing needed to preserve electrical properties. It is important for capacitors to be able to preserve their electrical properties over a wide temperature range, due to both the temperature variations that may occur in their application in addition to the heat applied to solder the capacitor electrodes when manufacturing a product with the device.

While shown here is only a single capacitive layer for purposes of illustration, a typical MLCC may comprise multiple layers. The problem may be the same for a many-layer MLCC or worse, given the instability that may arise from multiple stacks of alternating material layers. In addition, the shape of the MLCC may also be a factor in delamination, such as if the MLCC is not rectangular in horizontal cross section. The applicability of the invention described below is also not limited to any particular geometry.

A multilayer ceramic capacitor (MLCC) may be a device made of ceramic and metal that alternate to make a multi-layer chip. The capacitance value of an MLCC may be determined by several factors, such as geometry of the part, e.g., shape and size, and total active area. The dielectric constant, K, may be determined by the ceramic material. The total active area may be the overlap between two opposing electrodes. A thickness of the dielectric ceramic material may be inversely proportional to the capacitance value such that the thicker the dielectric, the lower the capacitance value. This may also determine the voltage rating, with a thicker dielectric layer comprising a higher voltage rating than a thinner one.

Figure 4:
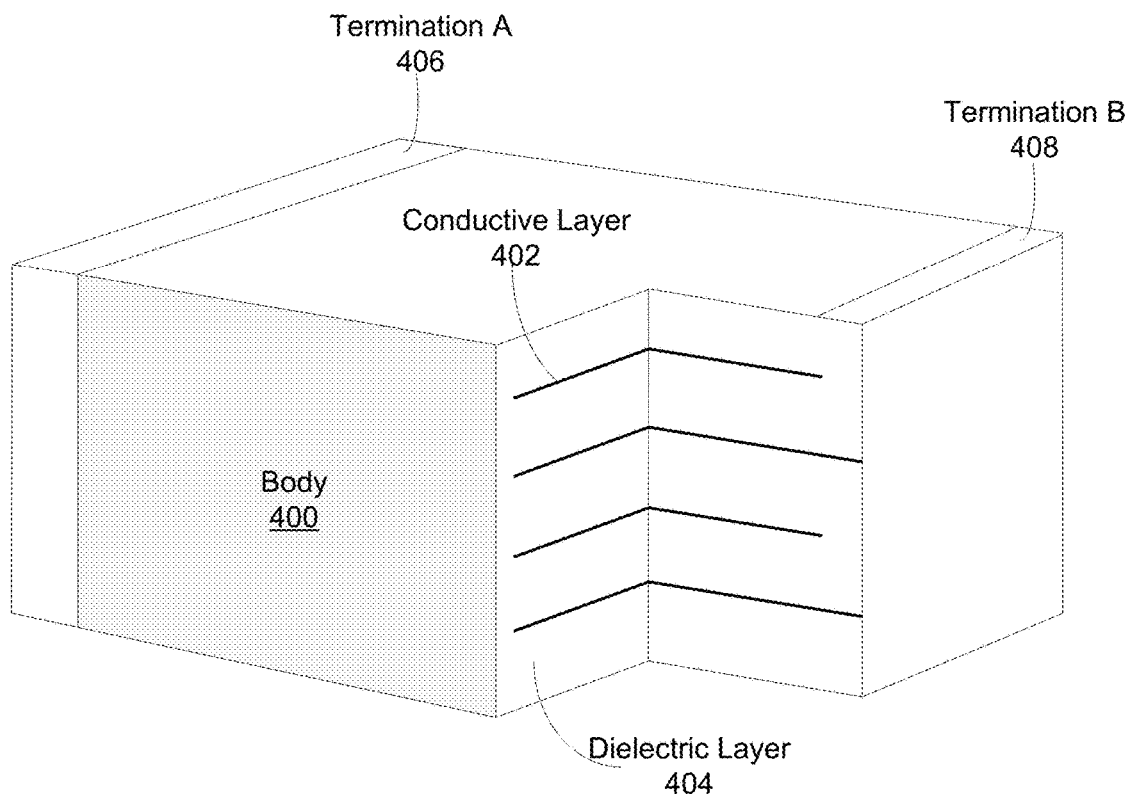
FIG. 4 is a cutaway perspective view of a conventional multilayer ceramic capacitor.

FIG. 4 is a cutaway perspective view of a conventional multilayer ceramic capacitor. The MLCC may comprise a laminated cube-shaped body 400 having alternately stacked conductive layer 402 and ceramic dielectric layer 404, and a pair of external termination A 406 and termination B 408 positioned at two opposite end portions of the body 400. The conductive layer 402 may be made from a noble metal and/or a base metal, e.g., copper, and nickel, silver, palladium, gold, and platinum. The dielectric layer 404 may be made from ceramic material, such as, e.g., barium titanate.

A plurality of conductive layer 402 may be alternately connected to termination A 406 and termination B 408, such that termination A 406 is connected to every second conductive layer 402, and termination B 408 is connected with the remaining conductive layer 402 not connected to termination A 406. Conductive layer 402 and dielectric layer 404 may have flat surfaces, and the thickness of conductive layer 402 may be spatially uniform, e.g., same height. When a voltage is applied to termination A 406 and termination B 408, the MLCC may produce electric fields between every two neighboring conductive layer 402 and store electric charges therein.

Figure 5:
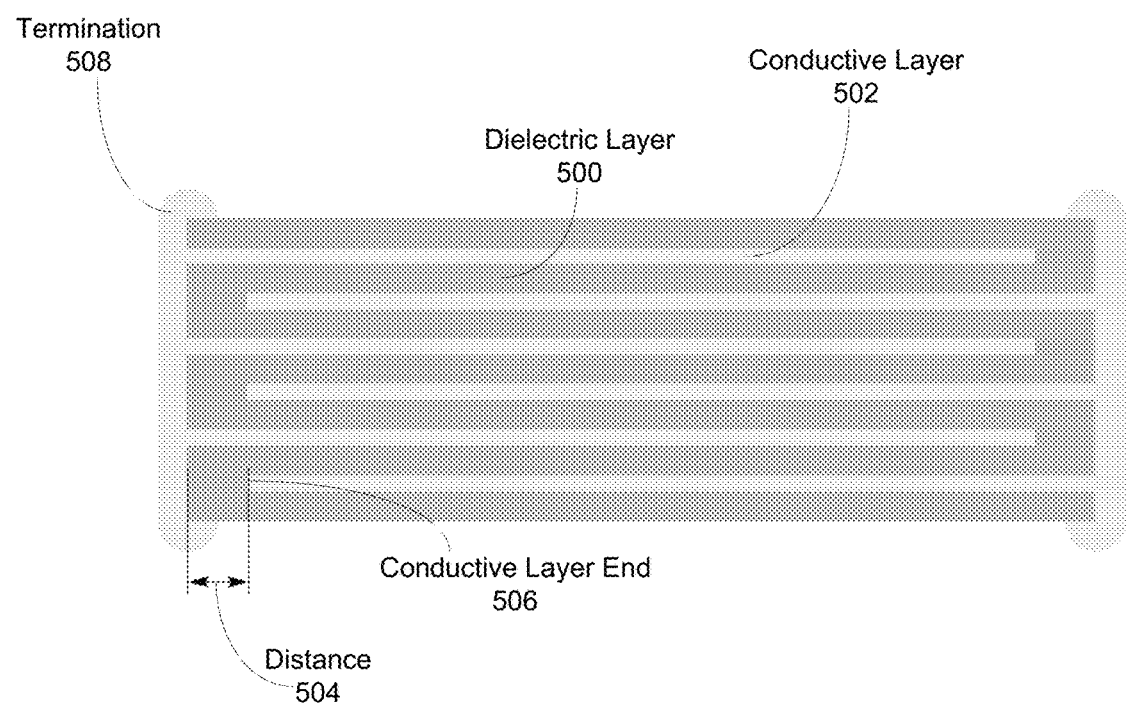
FIG. 5 is a schematic representation of a front cross-section view of a conventional multilayer ceramic capacitor.

FIG. 5 is a schematic representation of a front cross-section view of a conventional multilayer ceramic capacitor. Dielectric layer 500 and conductive layer 502 may be several microns thick, and distance 504 between a non-connecting conductive layer end 506 and a corresponding surface of termination 508 that is coupled to the capacitor's body may not be reducible to less than 500 microns due to the imprecise nature of prior art manufacturing processes.

Multilayer ceramic capacitors have traditionally been made by forming a tape from insulating ceramic slurry, printing conductive ink layers, pressing the layers together, and then sintering to form a laminated alternation of insulator and conductor. However, particularly in the case of a physically large MLCC, there is a possibility of delamination under the stress of temperature or pressure. If a layer separates, even slightly, there is a drop in the capacitance that can render it out of specification, or there can be complete device failure. In addition, the process may be limited to simple flat layers and complex shapes may not be possible, such as to avoid sharp corners that can cause voltage breakdown.

In at least one embodiment, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

Figure 6:
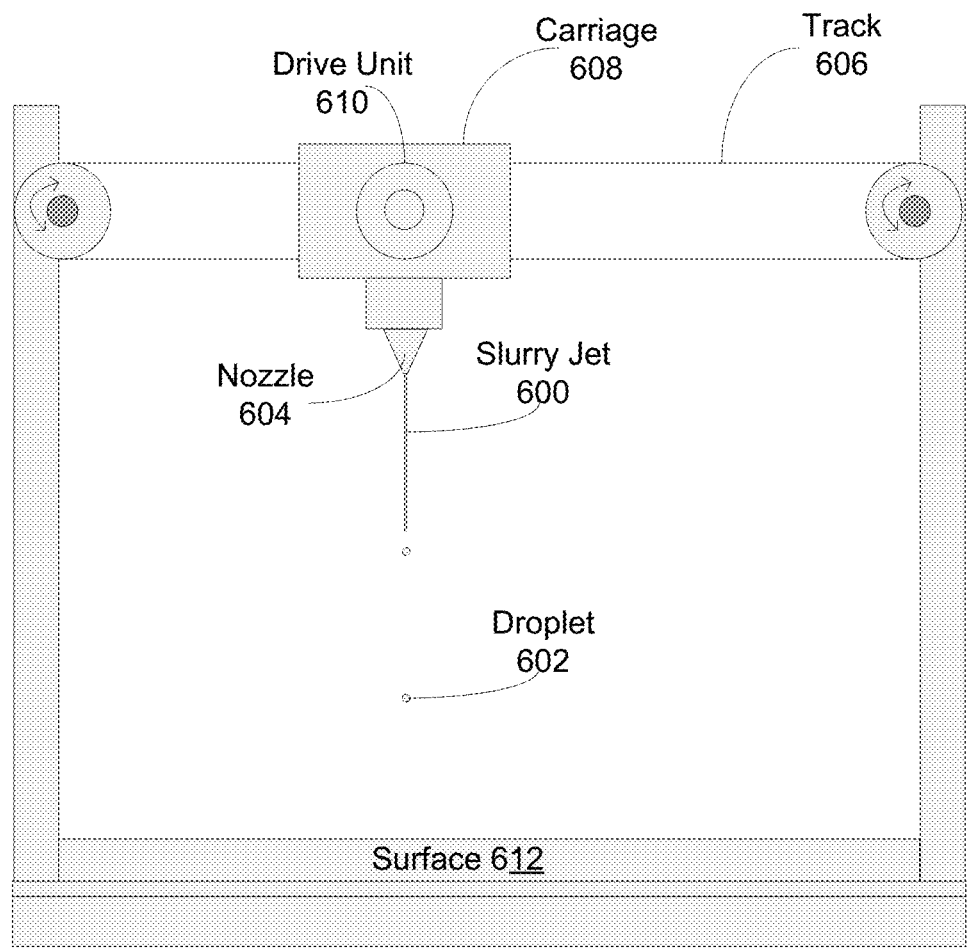
FIG. 6 is a system of a drop-on-demand type additive printer that may be used to implement one or more embodiments of the present invention.

FIG. 6 is a system of a drop-on-demand type additive printer that may be used to implement one or more embodiments of the present invention. A slurry jet 600 may be dispensed from a nozzle 604 having an orifice comprising an opening, and may be raster or vector scanned on track 606 by a carriage 608 driven by drive unit 610 over a surface 612 or on top of an already formed powder bed to define a new layer. Pressure may be used to force the slurry out of the nozzle and into a continuous stream of slurry jet 600 and/or as droplet 602, which may be defined as a breakup of the flow. A layer surface height measurement unit, such as, e.g., a laser rangefinder may be used to receive an input signal to control the height of the surface that is formed by varying the delivery of slurry.

A typical implementation of an additive manufacturing process begins with defining a three-dimensional geometry of the product using computer-aided design (CAD) software. This CAD data is then processed with software that slices the model into a plurality of thin layers. A physical part is then created by the successive printing of these layers to recreate the desired geometry. This process is repeated until all the layers have been printed. Typically, the resulting part is a "green" part, which may be an unfinished product that can undergo further processing, e.g., sintering. The green part may be dense and substantially non-porous.

Figure 7:
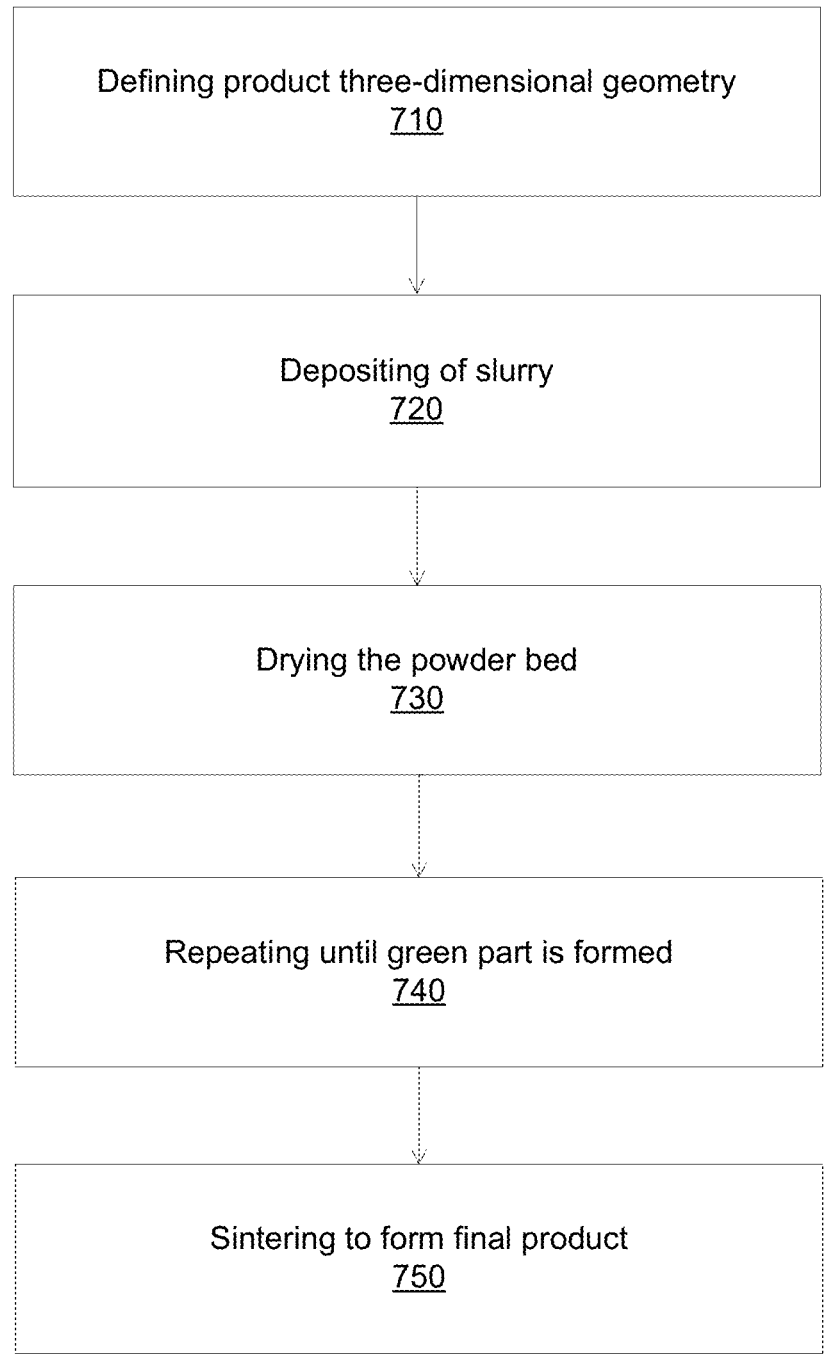
FIG. 7 is a flow diagram of a method of an additive printing process that may be implemented with one or more embodiments of the present invention.

FIG. 7 is a flow diagram of a method of an additive printing process that may be implemented with one or more embodiments of the present invention. Operation 710 defines a final product's three-dimensional geometry using CAD software. In operation 720 deposits layers of slurry comprising powder material and binder onto a surface or on top of a powder bed, which then slip-casts to make a new layer. As the slurry deposits in each two dimensional layer, the printer may select insulator or conductor as the material type, in separate passes or as a combined pass. The slurry may be deposited in any suitable manner, including depositing in separate, distinct lines, e.g., by raster or vector scanning, by a plurality of simultaneous jets that coalesce before the liquid slip-casts into the bed, or by individual drops. The deposit of slurry drops may be individually controlled, thereby generating a regular surface for each layer. Operation 730 dries any liquid from the powder bed, e.g., infrared flash-dry, after deposition of each layer. Operation 740 repeats operations 720 and 730 until a green part is formed. Operation 750 sinters the green part to form a final product. Sintering is a solid-state diffusion process that may be enhanced by increasing the surface area to volume ratio of the powder in any green part that is subsequently sintered.

In at least one embodiment, the present invention discloses a method and a system to increase structural stability of MLCC layers by rounding of conductive layer ends. The round ends may also eliminate areas of intense electric field, e.g., hotspots. Other configurations may also be possible, such as bulbous or wavy shapes.

Figure 8A:
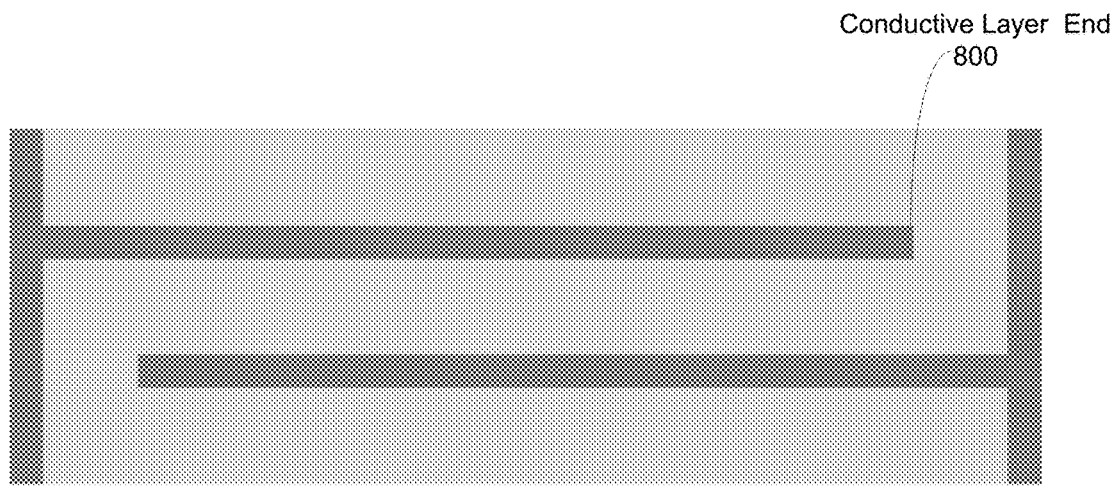
FIG. 8A is a schematic rendition of a prior art MLCC, shown as a flat projection.
Figure 8B:
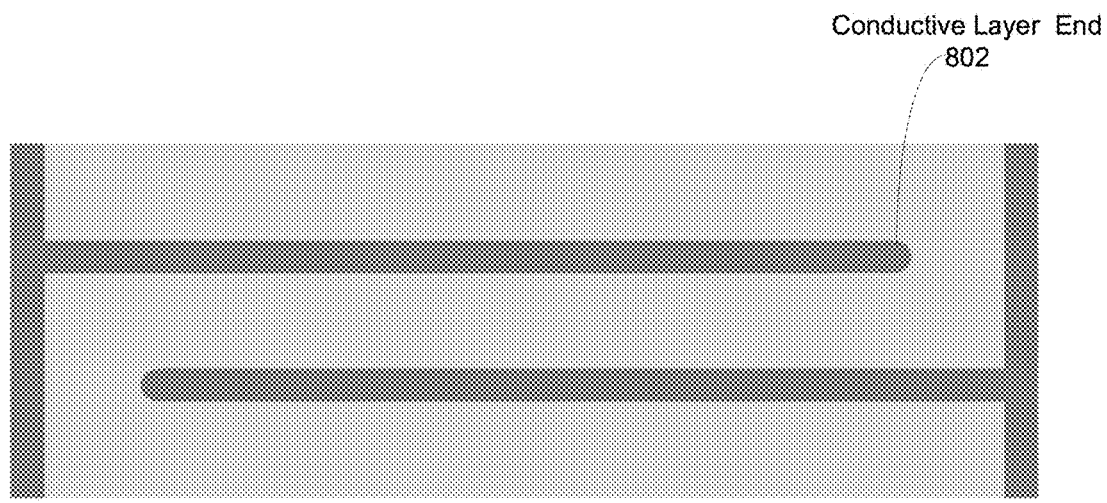
FIG. 8B shows improved capacitor conductors comprising decreased physical stress in insulator layers through rounding of conductor layer end, according to at least one embodiment.

FIG. 8A is a schematic rendition of a prior art MLCC, shown as a flat projection. The sharp corners of conductive layer end 800 may present stress singularities that are structurally unstable in response to stress, in addition to hotspots, e.g., areas of intense electric field that can lower maximum voltage. FIG. 8B shows improved capacitor conductors comprising decreased physical stress in insulator layers through rounding of conductor layer end 802, according to at least one embodiment. The rounding of the corners may be uniform in the depth direction, such that it comprises a cylindrical shape. Conductor layer end 802 may be described as comprising a half-circle cross-section or a dome-shape. The modification shown here also has the effect of removing an electrostatic singularity that occurs in the sharp endpoints of the conductor, which increases the maximum voltage the capacitor can be raised to without causing dielectric breakdown. The voltage may or may not be the limiting factor in a particular MLCC application; a separate invention disclosure focuses on increased energy density using the more complex geometries possible with 3D printing.

Figure 9A:
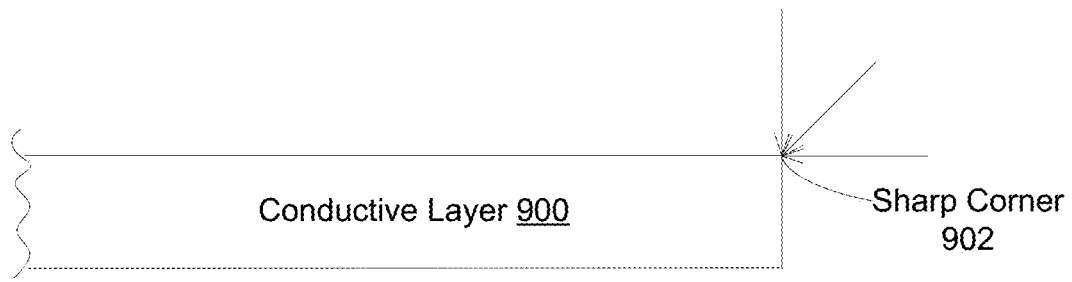
FIGS. 9A-E show various conductive layer end configurations, according to some embodiments.
Figure 9B:
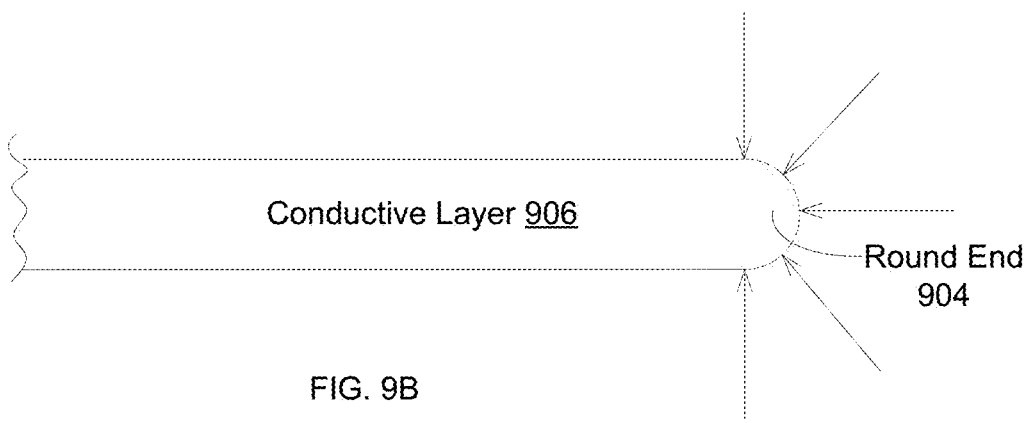

FIGS. 9A-E show various conductive layer end configurations, according to some embodiments. In FIG. 9A, a standard conductive layer end of an MLCC that's geometry is limited by its production process of tape casting. Conductive layer 900 may comprise sharp corner 902 present in the standard end, which may produce structural instability and unwanted 'hot spots' that can lower maximum operating voltage. Pressure may not be evenly distributed at the edge of conductive layer 900. FIG. 9B introduces a novel round end 902 of a conductive layer end 906 in accordance with an embodiment of the present invention. Round end 902 may comprise a convex dome shape with a wide-angle, e.g., greater than 180-degrees. Pressure may be evenly distributed at the edge of conductive layer end 906. This round shape is enabled by the precision of the method of drop-on-demand printing discussed above. The round shape eliminates sharp corners, therefore allows for maximum capacitance efficiency.

Figure 9C:
Figure 9E:
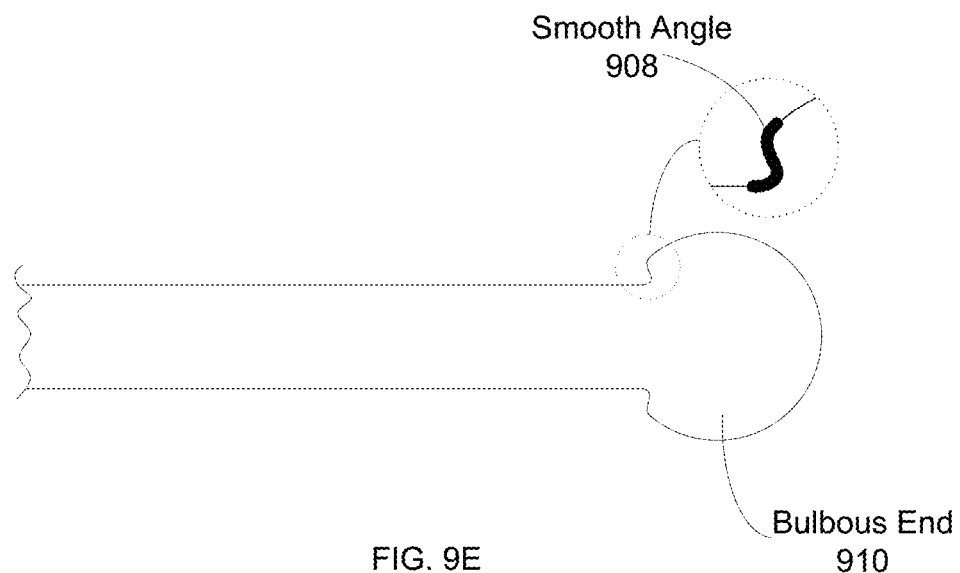
Figure 9D:
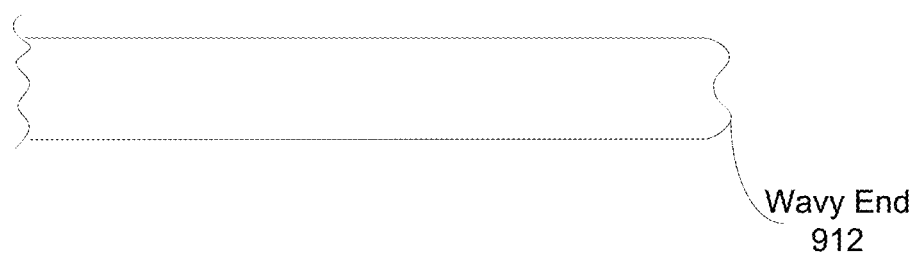

In FIG. 9C, a conductive layer end comprises a bulb shape. Bulbous end 904 may be thicker than the conductive layer and may comprise a wider-angle, e.g., greater than 90-degrees, sharp corner 906, when compared with the right-angle, e.g., 90-degrees, sharp corner 900 of FIG. 9A, thus improves voltage efficiency over the prior art. In FIG. 9D, sharp corner 906 of bulbous end 910 of FIG. 9C is further modified to comprise smooth angle 908 that may structurally resemble the letter "S", which eliminates unwanted sharp corners from the bulb configuration. Bulbous end 910 may resemble a mushroom shape. In FIG. 9E, the conductive layer end is modified into wavy end 912, which also eliminated sharp corners. Wavy end 912 may differ from round end 902 of FIG. 9B due to comprising two or more crests and one or more trough, and comprising at least one angle that is 90-degrees or less. Wavy end 912 may also be absent of any sharp corners.

Other shapes and configurations of electrode endpoints may be within the scope of the present invention. For example, conductor endpoints may comprise a wavy shape, or any other shape that eliminates or minimizes the aforementioned physical instability and hot spot.

For any geometry, a computer program is used to determine the field lines and equipotential lines. The optimum capacitance is when the density of field lines is as nearly uniform as possible, and the three ideas provide the parameters that are then adjusted until that optimum is achieved. This further exploits the precision possible with 3D Printing.

In at least one embodiment, the present invention discloses methods and systems to prevent or minimize MLCC delamination. Multi-layer ceramic capacitors, or MLCCs, have traditionally been made by forming a tape from an insulating ceramic slurry, printing conductive ink layers, and then pressing the layers together to form a laminated alternation of insulator and conductor. Particularly in the case of a physically large MLCC, there is possibility of delamination under the stress of temperature and/or pressure. If a layer separates, even slightly, there is a drop in the capacitance that can render it out of spec, or there can be complete device failure. An object of this invention is to provide a reinforcement of insulation material among and between layers of an MLCC, which may provide added mechanical endurance properties and represses or prevents delamination between the layers.

Embedded pillars of dielectric may be used to prevent delamination and increase mechanical strength. The lamination strength may be increased through a process of 'quilting', which is made possible with the systems and methods of the present invention, namely the technique of drop-on-demand printing, as the prior art process of 'tape casting' would not be able to accomplish this technique. Quilting may refer to the creation of spot connections, e.g., pillars, of insulator through the conductive layers.

Figure 10A:
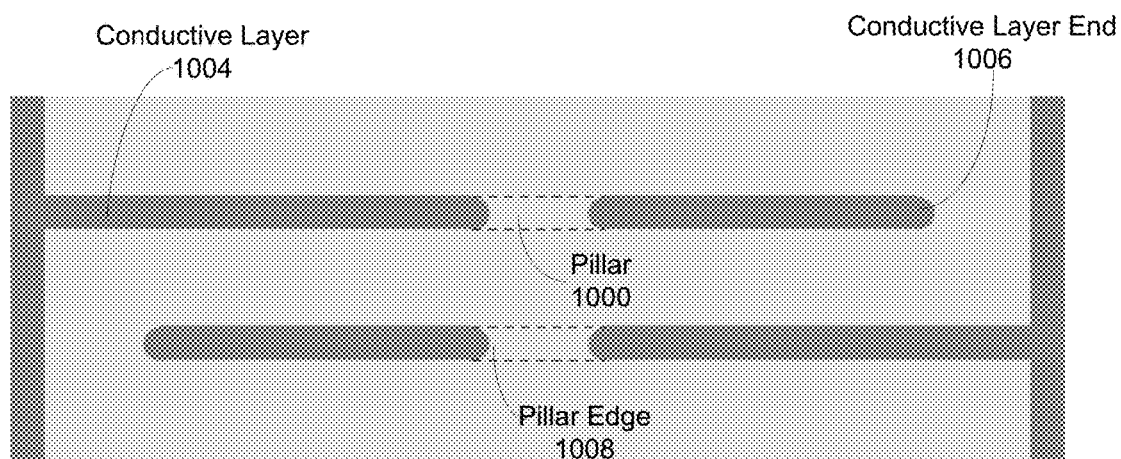
FIG. 10A is a front view of a flat projection of an MLCC showing quilted layers, according to at least one embodiment.

FIG. 10A is a front view of a flat projection of an MLCC showing quilted layers, according to at least one embodiment. One or more pillar 1000 may comprise insulator material, such as, e.g., barium titanate. The added insulator material may create a strong structure through conductive layer 1004 and may restrict the ability of the layers to separate. While a plurality of pillar 1000 among a plurality of conductive layers 1004 need not be vertically aligned into a column, strength is highest if they are so aligned. It is also possible to use other cross-sectional shapes for the pillar, other than circular, such as that of an I-beam, elliptical-shaped beam, and/or triangle-shaped beam. The tradeoff may be that a more complex cross-sectional shape for the pillar connections may create regions of high electrostatic intensity that may limit the voltage to which the device can be charged, although maximum strength and resistance to delamination may be increased. Therefore, the choice of shape depends on whether the capacitor performance is limited by maximum voltage or maximum strength.

The total volume of pillar 1000 should be the minimum amount needed to prevent structural failure, since the additional insulator material displaces conductive layer 1004's surface area and thus reduces capacitance. For example, pillar 1000's volume should not exceed a predetermined ratio to conductor layer 1004's volume, such as, e.g., ⅓. The exact design will be a function of the product requirements determined by marketing, so a highly delamination-resistant MLCC may have more quilting for high-temperature or high-pressure environments, for instance.

Conductive layer end 1006 may comprise a round or concave shape, such as a half-circle cross-section or a dome-shape. The rounded configuration may give the benefits of increasing maximum voltage through the reduction of areas of intense electric field, and may increase structural strength through the removal of stress singularities. In addition, pillar edge 1008 may comprise a round or convex shape, also for removal of stress singularities and reduction of intense electric field; however, the invention may not be so limited and pillar edge 1008 may comprise the standard end with sharp corners, if such resulting specification is desired.

Figure 10B:
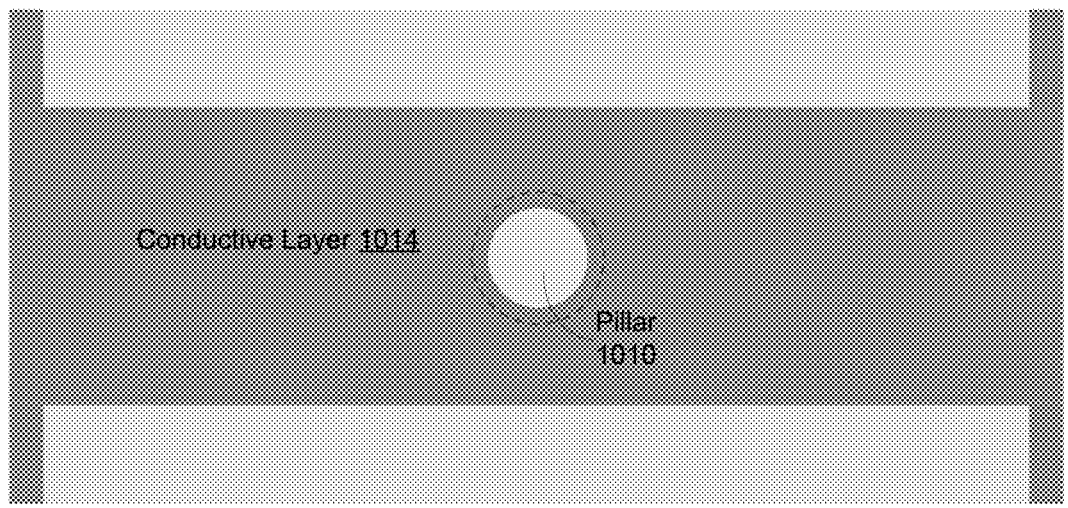
FIG. 10B is a top view of an MLCC showing a columnar pillar arrangement, according to at least one embodiment.

FIG. 10B is a top view of an MLCC showing a columnar pillar arrangement, according to at least one embodiment. One or more pillar 1010 may comprise may be arranged vertically in such a manner that a top pillar 1010 of a conductive layer 1014 super-imposes upon any and all pillars of layers above or below it. Different configurations may be employed, such as, e.g., the pillars may be placed juxtaposed to each other in the horizontal direction, or they may be irregularity spaced.

Figure 11A:
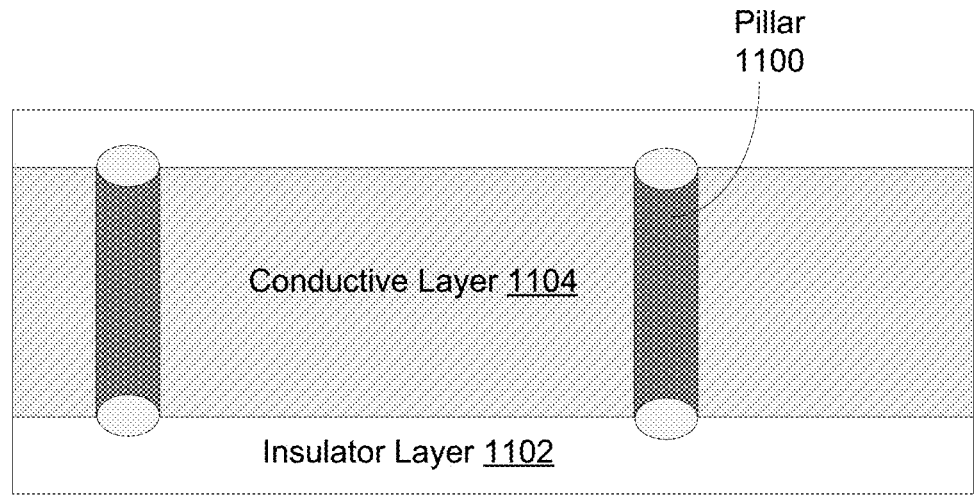
FIG. 11A is a cross-section view of a quilted MLCC, showing pillar arrangements through a conductive layer, according to at least one embodiment.

FIG. 11A is a cross-section view of a quilted MLCC, showing pillar arrangements through a conductive layer, according to at least one embodiment. One or more pillar 1100 may be disposed in any configuration, such as, e.g., evenly spaced or irregularly spaced. A plurality of pillar 1000 may be of an equal size or varying sizes, depending on the application.

As shown, two insulator layers 1102 and a middle conductive layer 1104 may be quilted together a plurality of pillar 1100. Pillar 1100 may be made from the same dielectric material as insulator layer 1102, or it may be of a different dielectric material. Using the same dielectric material may provide stronger bonding strength, and using a different dielectric material may affect capacitance. A predetermined thickness or diameter of pillar 1100 may depend on the material and thickness of the insulator layers 1102 and/or conductive layer 1104.

Additionally, individual pillar 1100 can be of any shape, such as, e.g., elliptical, circular, square, or triangular. The shape may depend on a predetermined bonding characteristic of the layers.

Figure 11B:
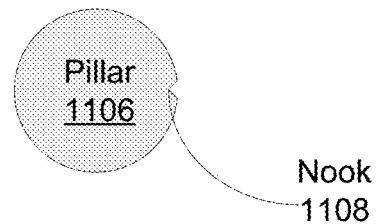
FIG. 11B is a top view of a pillar showing an added strength reinforcement structure, according to at least one embodiment.

FIG. 11B is a top view of a pillar showing an added strength reinforcement structure, according to at least one embodiment. Pillar 1106 may comprise nook 1108, which may be an area of recess on the perimeter of pillar 1106 used for added bond strength of pillar 1106 to the layers by its sharp inward protrusion, and increase of surface area. However, the sharp tip may present a stress singularities and/or hot spot (previously discussed), and therefore its occurrence may be minimized, such as, e.g., one or two per pillar, and its size may also be minimized, such as, e.g., less than 2 microns in length. FIG. 11B illustrates nook 1106 comprising a sharp angle tip, but other configurations may be used, such as, e.g., a nook that comprises a rounded tip, which may provide the desired strength without any sharp corner which may compromise capacitor efficiency.

Pillar 1106 may comprise a circular-shape cross-section, but other configurations are within the scope of the present invention. For example, pillar 1106's cross-section may be of a square-shape, elliptical-shape, or a triangle-shape, depending on the desired characteristic of the application.

Figure 12:
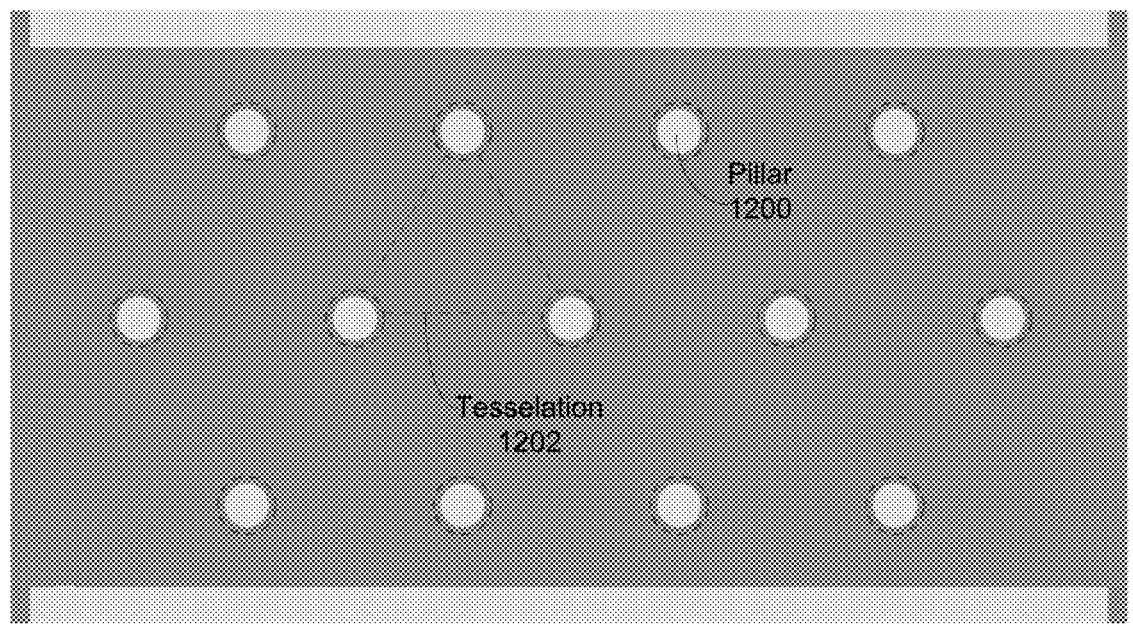
FIG. 12 shows a top view of a quilted MLCC, comprising multiple pillars, according to at least one embodiment.

FIG. 12 shows a top view of a quilted MLCC, comprising multiple pillars, according to at least one embodiment. Pillar 1200 may be configured in a triangle-shaped tessellation 1202, but may also be positioned according to any other configuration. The one shown here has the advantage of uniform resistance to delamination and mechanical strength. However, an irregular grid tessellation may have the advantage of lacking cleavage planes, using the well-known principle that amorphous structures are more resistant to planar cracking than regular structures. Either could be used, depending on the situation.

Figure 13A:
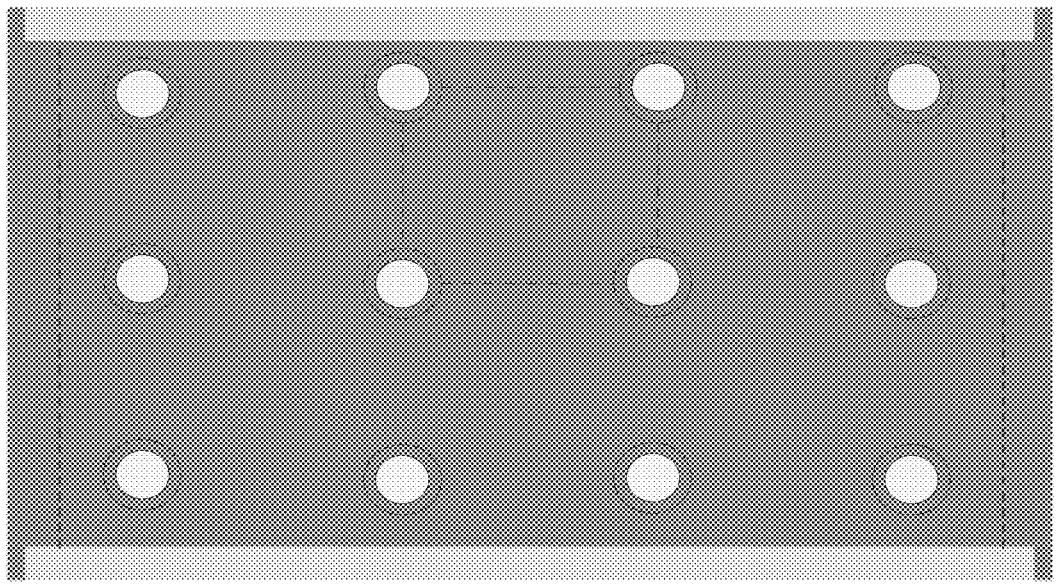
FIGS. 13A-B are top views depicting different configurations of pillar arrangements, according to at least one embodiment.
Figure 13B:
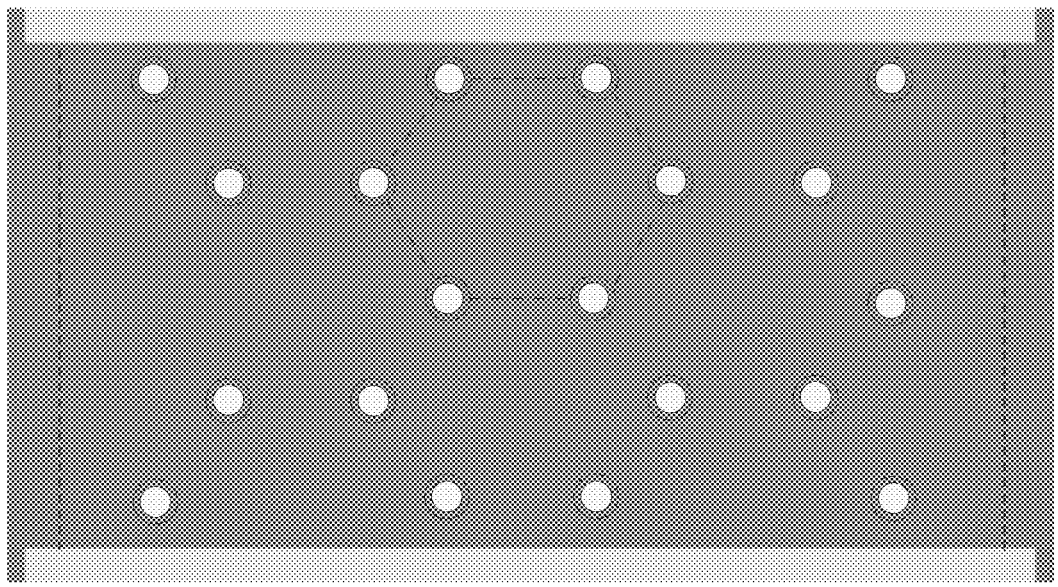

FIGS. 13A-B are top views depicting different configurations of pillar arrangements, according to at least one embodiment. FIG. 13A is a multiple-pillar arrangement configured in a square tessellation. There may be any number of rows and columns of pillars in the configuration. The pillars may have a single spot connection pattern surrounding its perimeter, or if required, there may two or more spot connections for added reinforcement.

FIG. 13B is a multiple-pillar arrangement configured in a polygonal tessellation. In general, the tessellation may be in any N-sided polygon configuration, for example, triangle, square, pentagon, hexagon, heptagon, octagon, nonagon, decagon, hendecagon, or dodecagon for N=3, 4, 5, 6, 7, 8, 9, 10, 11 or 12, respectively. The arrangement may also be a mixture of different configurations of planar tessellations, such as, e.g., comprising a combination of triangle, square, and polygon tessellations. The choice of pattern may depend on a predetermined mechanical strength value of the quilting and/or the maximum voltage rating of the MLCC. However, the total volume of the pillars may not exceed a predetermined ratio to the conductor layer on which it is present to prevent device failure, such as, e.g., 1/3 or 2/3 ratios.

Figure 14:
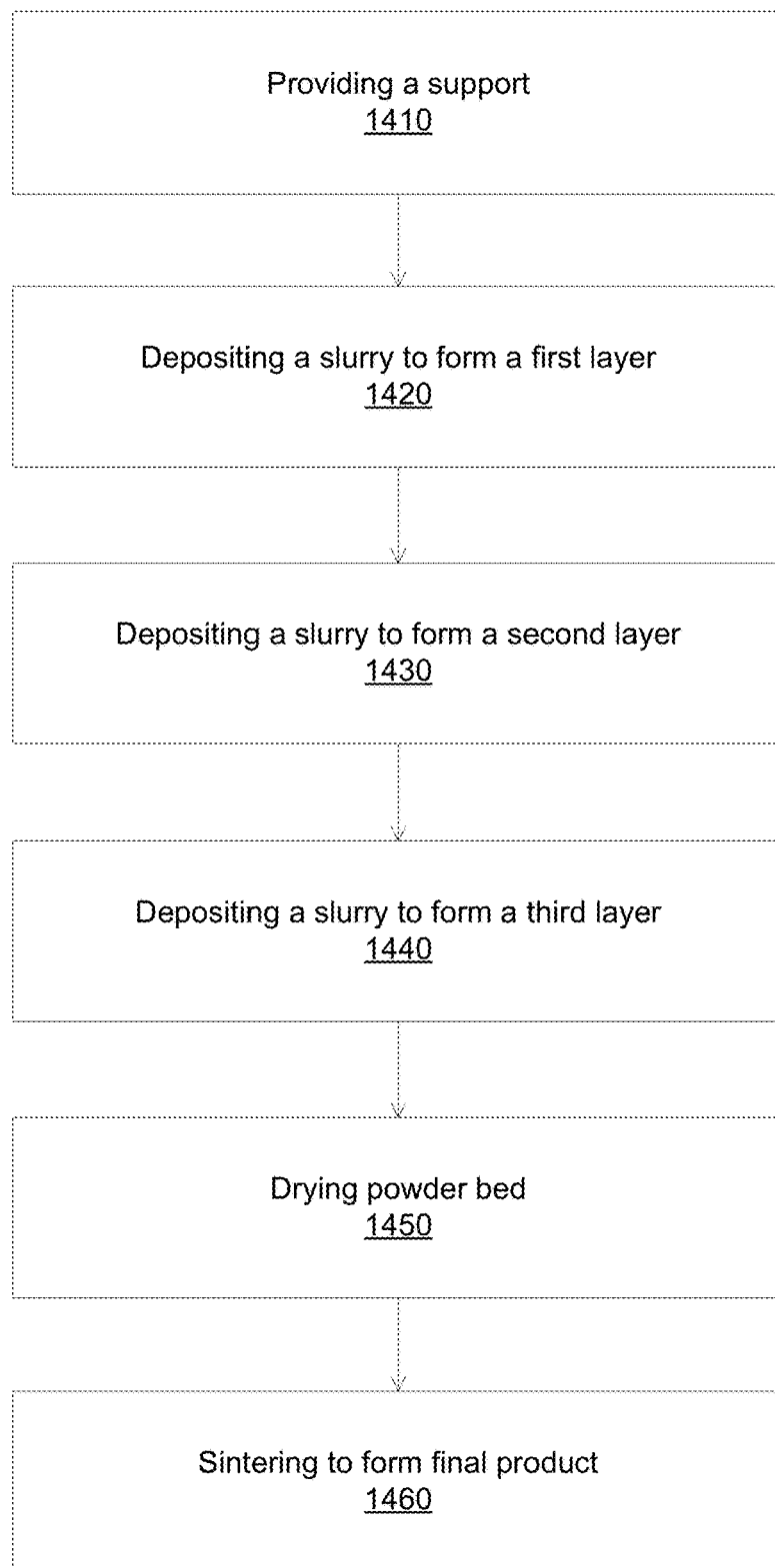
FIG. 14 is a flow diagram of a method of additive manufacturing that may be implemented in one or more embodiments of the present invention.

FIG. 14 is a flow diagram of a method of additive manufacturing that may be implemented in one or more embodiments of the present invention. Operation 1410 provides a support over a selected area. Operation 1420 deposits liquid slurry to form a first layer comprising conductive metal, such as, e.g., copper, nickel, silver, palladium, gold, and/or platinum. The slurry may be deposited as continuous parallel streams, or as individually controlled droplets, thereby generating a regular surface for each layer. Operation 1430 deposits liquid slurry to form a second layer comprising dielectric or ceramic material comprising barium titanate. Operation 1440 deposits liquid slurry to form a third layer. The third layer may comprise the same material as the first layer. The first and the third layers of the capacitor may comprise a convex round and/or bulbous and/or wavy configuration disposed at a conductive layer end and/or at a pillar edge. A pillar may comprise dielectric material disposed through a portion of a conductive layer. The pillar may also comprise one or more spot connections at its perimeter. A plurality of pillars may be configured in a planar tessellation. In some embodiments, operation 1420 and operation 1430 sequentially repeat until a predetermined amount of alternating layers of conductor and dielectric material is achieved. Operation 1450 dries the powder bed by flash drying, e.g., infrared heating. Operation 1460 sinters the layers to form a final product.

Figure 15:
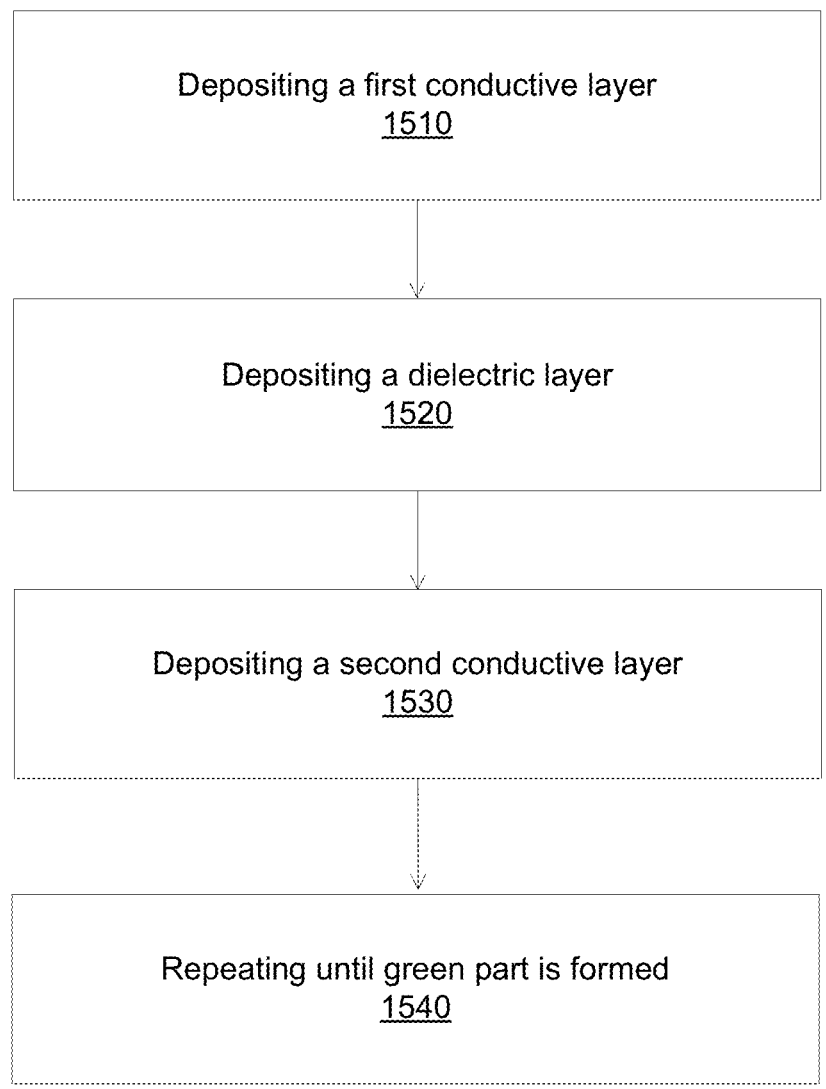
FIG. 15 is a flow diagram of another method of additive manufacturing that may be implemented in one or more embodiments of the present invention.

FIG. 15 is a flow diagram of another method of additive manufacturing that may be implemented in one or more embodiments of the present invention. Operation 1510 deposits a first conductive layer onto a surface. Operation 1520 deposits a dielectric layer on a top surface of the first conductive layer. Operation 1530 deposits a second conductive layer onto a top surface of the dielectric layer. Optionally, operation 1540 repeats operation 1520 and operation 1530 successively and sequentially such that the conductive layers and the dielectric layers alternate, and the conductive layers are disposed at both the bottom layer and the top layer, although in practice, the MLCCs may be manufactured with dielectric layers disposed at both the bottom layer and the top layer.

The aforementioned steps may produce a ceramic capacitor comprising a first conductive layer formed on a surface of a dielectric layer, and a second conductive layer formed on the opposing surface of the dielectric layer. The first and the second conductive layers of the capacitor may comprise a convex round and/or bulbous and/or wavy configuration disposed at the conductive layer end and/or at a pillar edge. The dielectric layer may comprise a concave round and/or bulbous and/or wavy configuration disposed at the dielectric layer edge. A pillar may comprise dielectric material disposed through a portion of a conductive layer. The pillar may also comprise one or more spot connections at its perimeter. A plurality of pillars may be configured in a planar tessellation.

In at least one embodiment, the present invention discloses a system and a method for optimizing geometry of a multilayer ceramic capacitor by using an algorithm of a computing device comprising a memory and processor to determine configurations of conductive layer ends and/or arrangements of one or more pillars based on predetermined specifications or properties of the capacitor. The algorithm may be inputted with one or more desired specification or property, such as, e.g., maximum capacitance, and may output the most cost effective size, shape, and/or configuration of an ideal MLCC to match the desired specification or property. Once a capacitor configuration is determined, an additive manufacturing printer communicatively coupled to the algorithm may produce the desired product.

Figure 16:
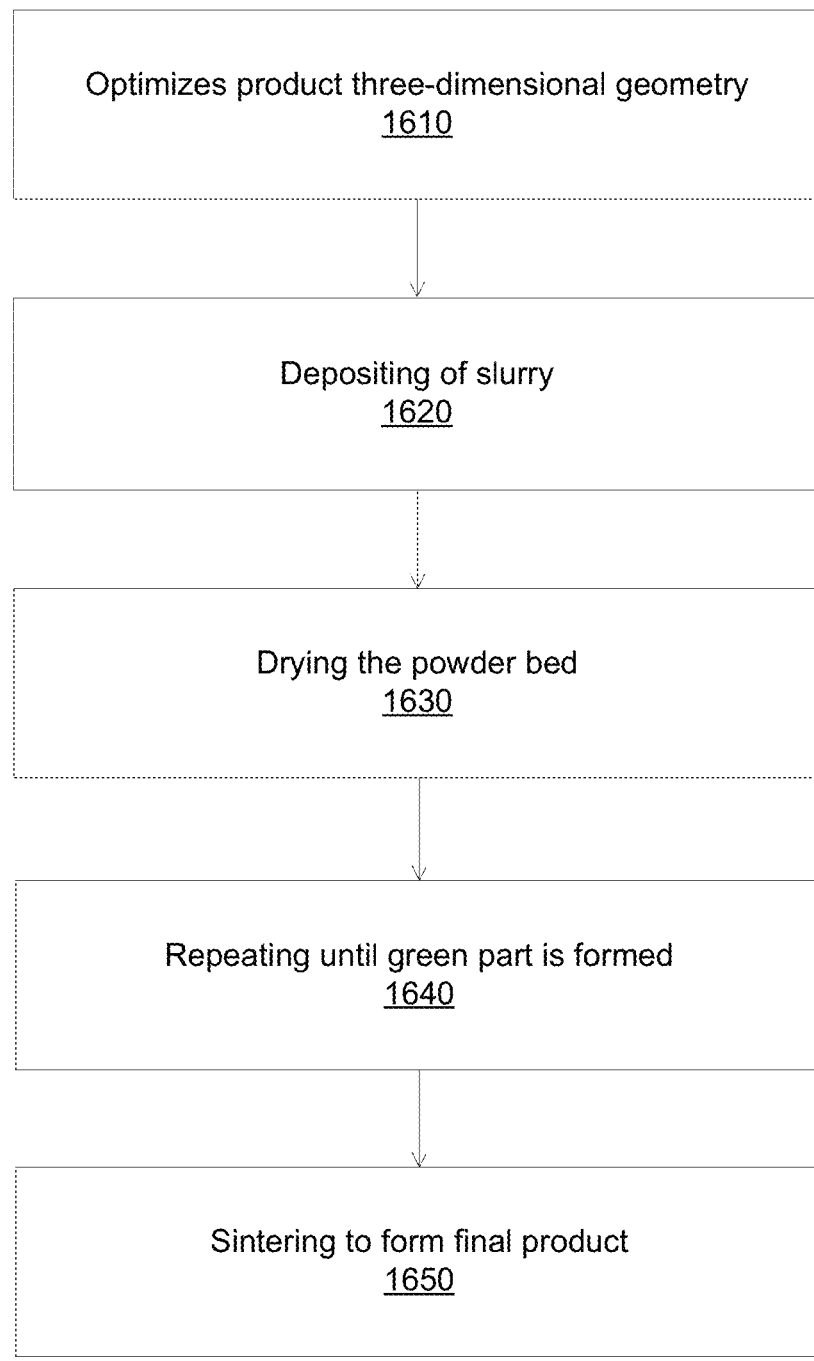
FIG. 16 is a flow diagram of a method of an additive printing process that may be implemented with one or more embodiments of the present invention.

FIG. 16 is a flow diagram of a method of an additive printing process that may be implemented with one or more embodiments of the present invention. Operation 1610 optimizes a final product's three-dimensional geometry using CAD software. An algorithm of a computing device may be used to maximize uniformity of electric field lines and equipotential lines to maximize capacitance of an MLCC. In operation 1620 deposits layers of slurry comprising powder material and binder onto a surface or on top of a powder bed, which then slip-casts to make a new layer. As the slurry deposits in each two dimensional layer, the printer may select insulator or conductor as the material type, in separate passes or as a combined pass. The slurry may be deposited in any suitable manner, including depositing in separate, distinct lines, e.g., by raster or vector scanning, by a plurality of simultaneous jets that coalesce before the liquid slip-casts into the bed, or by individual drops. The deposit of slurry drops may be individually controlled, thereby generating a regular surface for each layer. Operation 1630 dries any liquid from the powder bed, e.g., infrared flash-dry, after deposition of each layer. Operation 1640 repeats operations 1620 and 1630 until a green part is formed. Operation 1650 sinters the green part to form a final product. Sintering is a solid-state diffusion process that may be enhanced by increasing the surface area to volume ratio of the powder in any green part that is subsequently sintered.

Figure 17:
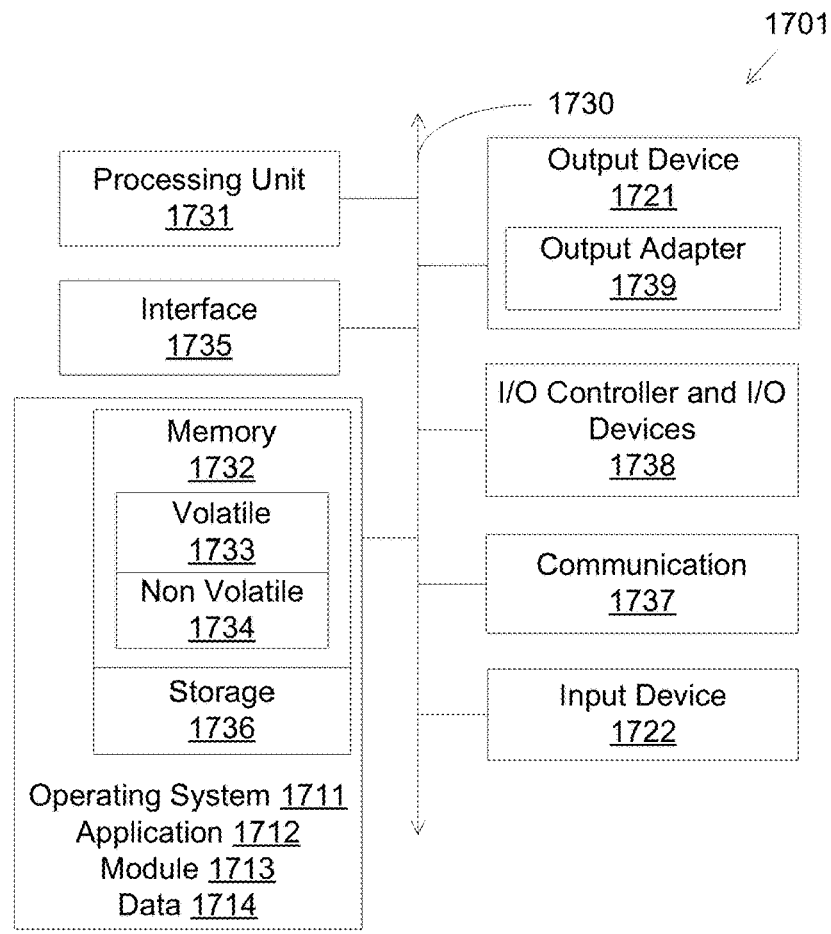
FIG. 17 illustrates a computing environment, according to some embodiments.

FIG. 17 illustrates a computing environment, according to some embodiments. An exemplary environment 1700 for implementing various aspects of the invention includes a computer 1701, comprising a processing unit 1731, a system memory 1732, and a system bus 1730. The processing unit 1731 may be any of various available processors, such as single microprocessor, dual microprocessors or other multiprocessor architectures. The system bus 1730 may be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 1732 may include volatile memory 1733 and nonvolatile memory 1734. Nonvolatile memory 1734 may include read only memory (ROM), programmable ROM (PROM), electrically programmable ROM (EPROM), electrically erasable ROM (EEPROM), or flash memory. Volatile memory 1733, may include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

Computer 1701 also includes storage media 1736, such as removable/nonremovable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 1735 may be used to facilitate connection.

The computer system 1701 further may include software to operate in environment 1700, such as an operating system 1711, system applications 1712, program modules 1713 and program data 1714, which are stored either in system memory 1732 or on disk storage 1736. Various operating systems or combinations of operating systems may be used.

Input devices 1722 may be used to enter commands or data, and may include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 1738. Interface ports 1738 may include a serial port, a parallel port, a game port, a universal serial bus (USB), and a 1394 bus. The interface ports 1738 may also accommodate output devices 1721. For example, a USB port may be used to provide input to computer 1701 and to output information from computer 1701 to an output device 1721. Output adapter 1739, such as video or sound cards, is provided to connect to some output devices such as monitors, speakers, and printers.

Computer 1701 may operate in a networked environment with remote computers. The remote computers may comprise a memory storage device, and may be a personal computer, a server, a router, a network PC, a workstation, a microprocessor based appliance, a peer device or other common network node and the like, and typically includes many or all of the elements described relative to computer 1701. Remote computers may be connected to computer 1701 through a network interface and communication connection 1737, with wire or wireless connections. A network interface may be communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereof, packet switching networks, and Digital Subscriber Lines (DSL).

Figure 18:
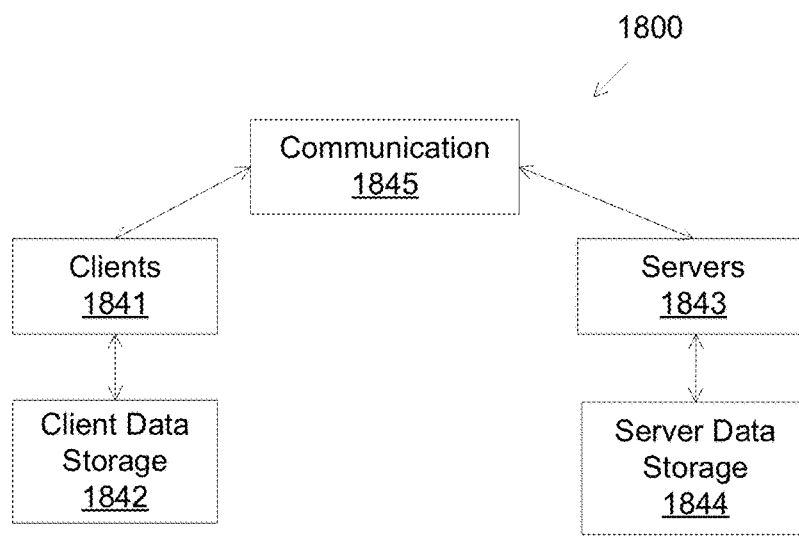
FIG. 18 is a schematic block diagram of a sample computing environment with which the present invention may interact.

FIG. 18 is a schematic block diagram of a sample computing environment 1800 with which the present invention may interact. The system 1840 includes a plurality of client systems 1841. The system also includes a plurality of servers 1843. The servers 1843 may be used to employ the present invention. The system includes a communication network 1845 to facilitate communications between the clients 1841 and the servers 1843. Client data storage 1842, connected to client system 1841, may store information locally. Similarly, the server 1843 may include server data storages 1844.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A multilayer ceramic capacitor, comprising:
a ceramic body;
one or more dielectric layers alternately stacked with two or more conductive layers;
one or more pillars disposed through the two or more conductive layers for preventing delamination of the one or more dielectric layers and the two or more conductive layers,
wherein at least one conductive layer comprises a conductive layer end comprising a round shape for increasing structural stability of the capacitor;
a pair of external terminations disposed at opposite end portions of the body, and
wherein the two or more conductive layers are alternately coupled to an external termination of the pair of external termination, and
wherein a total volume of the one or more pillars and a total volume of the conductive layer through which it is disposed does not exceed a predetermined ratio.

2. A multilayer ceramic capacitor, comprising:
a ceramic body;
one or more dielectric layers alternately stacked with two or more conductive layers;
one or more pillars disposed through the two or more conductive layers for preventing delamination of the one or more dielectric layers and the two or more conductive layers,
wherein at least one conductive layer comprises a conductive layer end comprising a round shape for increasing structural stability of the capacitor;
a pair of external terminations disposed at opposite end portions of the body, and
wherein the two or more conductive layers are alternately coupled to an external termination of the pair of external termination, and
wherein the one or more pillars comprise a dielectric material.

3. The multilayer ceramic capacitor of claim 2, further comprising:
wherein the one or more pillars comprise the same dielectric material as the one or more dielectric layers.

4. The multilayer ceramic capacitor of claim 2, further comprising:
wherein the one or more pillars comprise a different dielectric material as the one or more dielectric layers.

5. A multilayer ceramic capacitor, comprising:
a ceramic body;
one or more dielectric layers alternately stacked with two or more conductive layers;
one or more pillars disposed through the two or more conductive layers for preventing delamination of the one or more dielectric layers and the two or more conductive layers,
wherein at least one conductive layer comprises a conductive layer end comprising a round shape for increasing structural stability of the capacitor;
a pair of external terminations disposed at opposite end portions of the body,
wherein the two or more conductive layers are alternately coupled to an external termination of the pair of external termination, and
wherein the one or more pillars comprise a nook for increased structural stability.

6. The multilayer ceramic capacitor of claim 5, further comprising:
wherein the nook comprises a rounded tip.

7. The multilayer ceramic capacitor of claim 5, further comprising:
wherein the nook is less than 2 microns in length.

* * * * *